US007532228B2

(12) United States Patent
No

(10) Patent No.: US 7,532,228 B2
(45) Date of Patent: May 12, 2009

(54) METHOD FOR SETTING LASER POWER IN OPTICAL DISC DRIVE

(75) Inventor: Sang Chul No, Pyeongtaek-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 345 days.

(21) Appl. No.: 11/410,838

(22) Filed: Apr. 26, 2006

(65) Prior Publication Data

US 2006/0244811 A1     Nov. 2, 2006

(30) Foreign Application Priority Data

Apr. 29, 2005  (KR) ..................... 10-2005-0035811
Jun. 9, 2005   (KR) ..................... 10-2005-0049095

(51) Int. Cl.
    *B41J 2/435* (2006.01)
(52) U.S. Cl. ................... 347/246; 347/236; 347/224
(58) Field of Classification Search ......... 347/224–225, 347/236–237, 246–247; 369/47.53; 372/32
    See application file for complete search history.

(56) References Cited

U.S. PATENT DOCUMENTS 5,249,172 A * 9/1993 Hagihara et al. ......... 369/47.53
2003/0174744 A1* 9/2003 Reilly ..................... 372/32

2004/0224041 A1  11/2004 Morishima
2005/0046692 A1   3/2005 Bronson
2005/0058044 A1   3/2005 Koegler, III et al.

FOREIGN PATENT DOCUMENTS

EP      0 478 275 A2   4/1992
EP      1 308 938 A2   5/2003

* cited by examiner

*Primary Examiner*—Hai C Pham
(74) *Attorney, Agent, or Firm*—Ked & Associates, LLP

(57) ABSTRACT

A method for setting a laser power of an optical disc drive is provided. To perform a label-printing operation on a label surface of an optical disc, an optical pickup unit is shifted to a control feature zone of the label surface, and a laser power operation is performed prior to initiating label printing using power setup data and sensitivity related to an internal laser diode sensor of the optical pickup unit detected during manufacture of the optical disc drive. Alternatively, power setup data associated both a data surface and a label surface of the optical disc may be detected and stored during manufacture of the optical disc drive, and a laser power of predetermined magnitude may determined based on the power setup data previously stored in association with the seated surface of the optical disc. The power setup data may be represented by a substantially linear equation relating the input voltage to the output laser power. Therefore, an optimum laser power for a label surface may be determined prior to actually printing an image on the label surface, thus minimizing error associated with the output laser power, and enhancing label-printing quality.

6 Claims, 9 Drawing Sheets

S1 : $y=a*(x+g1)+b$ ; $y=c*(x+g1)+d$
=> $y=a*x+b+a*g1$ ; $y=c*x+d+c*g1$

S2 : $y=a*(x-g2)+b$ ; $y=c*(x-g2)+d$
=> $y=a*x+b-a*g2$ ; $y=c*x+d-c*g2$

| | #1 | #2 | #3 | #4 | #5 | #6 | #7 | #8 | #9 | #10 |
|---|---|---|---|---|---|---|---|---|---|---|
| Conv. | 51.0 | 54.8 | 53.4 | 53.4 | 53.2 | 54.3 | 54.0 | 53.2 | 51.5 | 54.3 |
| This invention | 58.2 | 60.5 | 59.9 | 60.7 | 59.9 | 60.4 | 60.4 | 60.7 | 59.0 | 61.6 |

| | #11 | #12 | #13 | #14 | #15 | #16 | #17 | #18 | #19 | #20 |
|---|---|---|---|---|---|---|---|---|---|---|
| Conv. | 53.6 | 53.9 | 52.8 | 51.8 | 53.9 | 52.2 | 52.0 | 53.6 | 54.0 | 52.3 |
| This invention | 60.0 | 61.4 | 59.2 | 58.6 | 60.7 | 61.4 | 59.5 | 60.1 | 60.2 | 59.4 |

METHOD FOR SETTING LASER POWER IN OPTICAL DISC DRIVE

BACKGROUND OF THE INVENTION

1. Field of the Invention

The invention is related to a method for setting laser power, and, more particularly, to a method for setting a laser output power level in an optical disc drive.

2. Background of the Related Art

Optical discs have been developed recently which allow data to be recorded on a data surface of the disc, and a label with a desired design to be printed on a non-data, or label, surface opposite the data surface of the disk. The surface of the disc on which a label is printed is referred to as the label surface of the disc. Labels may be transferred onto the label surface of the disc using a laser etching technology commonly referred to as LightScribe, in which a laser burns or etches an image onto a specially prepared, non-data side of an optical disc.

Generally, laser power required to record data on an optical disc varies based on recording speed and other recording medium characteristics. Typically, an input voltage (DAC) of a Radio Frequency (R/F) Integrated Circuit (IC) is controlled to set laser power at a desired magnitude. However, the actual magnitude of laser power output for a given input voltage (DAC) may differ based on differences or deviations in optical pickups and R/F IC characteristics. Therefore, during manufacture of an optical disc drive, the relationship between an input voltage (DAC) and an actual output laser power (P) associated with the input voltage (DAC) is measured and stored in a ROM (Read Only Memory) for each device, such that an output laser power of a desired magnitude can be set based on the measured result.

Generally, in order to calculate the relationship between the input voltage and the output laser power, actual output laser power is measured using a device specifically designed for that purpose such as, for example, a laser power meter, during manufacture of the optical disc drive. The relationship between the input voltage applied to the R/F IC and the laser power generated from the optical pickup unit is typically at least partially linear. Therefore, a linear equation relating the input voltage (DAC) to the laser power (P), which reflects power setup data for selected points during the manufacturing process, has been widely used to establish this relationship.

When printing a label on a label surface of an optical disc such as, for example, the LightScribe disc discussed above, an input voltage corresponding to a desired laser power is calculated using a linear relationship between the input voltage and the desired laser power detected during the manufacturing process of the optical disc drive. The calculated input voltage is applied to the R/F IC, such that a label-printing operation can be performed with a laser power of predetermined magnitude.

However, this type of label-printing operation requires the laser to output power at a much higher level than would typically be required to perform a recording operation on the data surface of the disc. If the laser output value is increased above a predetermined value based on an increment of the input voltage, the relationship between the input voltage and the laser power is no longer linear, as shown in FIG. 1, and the ratio (i.e., slope) of output laser power to input voltage is gradually reduced. In this manner, if the linear relationship between the input voltage and the output laser power is changed, an unexpected error occurs in a laser power setup process as denoted by $\Delta P_{error} = P_{actual} - P_{ideal}$, resulting in a deterioration in printing quality on the label surface of the disc.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Therefore, it is an object of the invention to provide a method for setting a laser power such that a high-quality label can be printed on a LightScribe disc.

It is another object of the invention to provide a method for setting a laser power of a laser diode such that a high-output laser power required when a label is printed on a LightScribe disc can be correctly output.

In accordance with the invention as embodied and broadly described herein, a method for setting a laser power of an optical disc drive in which power setup data and sensitivity data of a laser diode internal sensor are stored includes, controlling a laser power using the power setup data and the sensitivity data in a predetermined area of the label surface, and performing a label-printing operation in a label area contained in the label surface if a LightScribe disc is seated on a label surface in the optical disc drive.

In certain embodiments, the power setup data and the sensitivity may be detected and stored during manufacture of the optical disc drive, and the power setup data may be denoted by a substantially linear equation indicative of the relationship between an input value and an output laser power.

In certain embodiments, the predetermined area may be an area which does not react to a laser output caused by the laser power control operation, such as, for example, a control feature zone.

In certain embodiments, controlling the laser power may include calculating a target value of a sensor output value corresponding to an output laser power to be set using the sensitivity data, and calculating an input value for generating the output laser power to be set using the power setup data, operating a laser diode using the calculated input value, and at the same time detecting a sensor output value, and comparing the detected sensor output value with the calculated target value, and controlling a laser power according to the compared result, and wherein the laser power may be increased if the detected sensor output value is higher than the calculated target value.

In certain embodiments, the power setup data and the sensitivity may be detected and stored during manufacture of the optical disc drive and the power setup data may be denoted by a substantially linear equation indicative of the relationship between an input value and an output laser power, and power setup data associated with at least one, and preferably with at least two output laser power zones is detected and stored.

In certain embodiments, the output laser power zones may be classified into a first zone including a first record power for a data surface of the optical disc and a second zone including a second record power for a label surface of a LightScribe disc.

In certain embodiments, detecting individual power setup data units in a predetermined number of output laser power zones, and storing the detected power setup data units may include detecting output laser power of two predetermined input values at which it is expected that a value contained in a corresponding zone will be generated, and calculating a linear equation relating an input value to an output laser power on the basis of the two predetermined input values and the detected output laser power, and storing the calculated linear equation.

Alternatively, detecting individual power setup data units in a predetermined number of output laser power zones, and storing the detected power setup data units may include detecting output laser power of a predetermined input value at which it is expected that a value contained in a corresponding zone will be generated, and calculating a linear equation relating an input value to an output laser power on the basis of the predetermined input value, the detected output laser power, and the slope characteristic between the input value and the output laser power, and storing the calculated linear equation.

Alternatively, detecting individual power setup data units in a predetermined number of output laser power zones, and storing the detected power setup data units may include detecting an output laser power associated with a predetermined input value, searching for a second input value generating the detected laser power from the stored curve data, and calculating a difference between the second input value and the predetermined input value, and calculating a linear equation relating the input value of the optical disc drive to the output laser power on the basis of the difference and the stored linear equation, and storing the calculated linear equation.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

BEST MODE OR DETAILED DESCRIPTION

Figure 2:
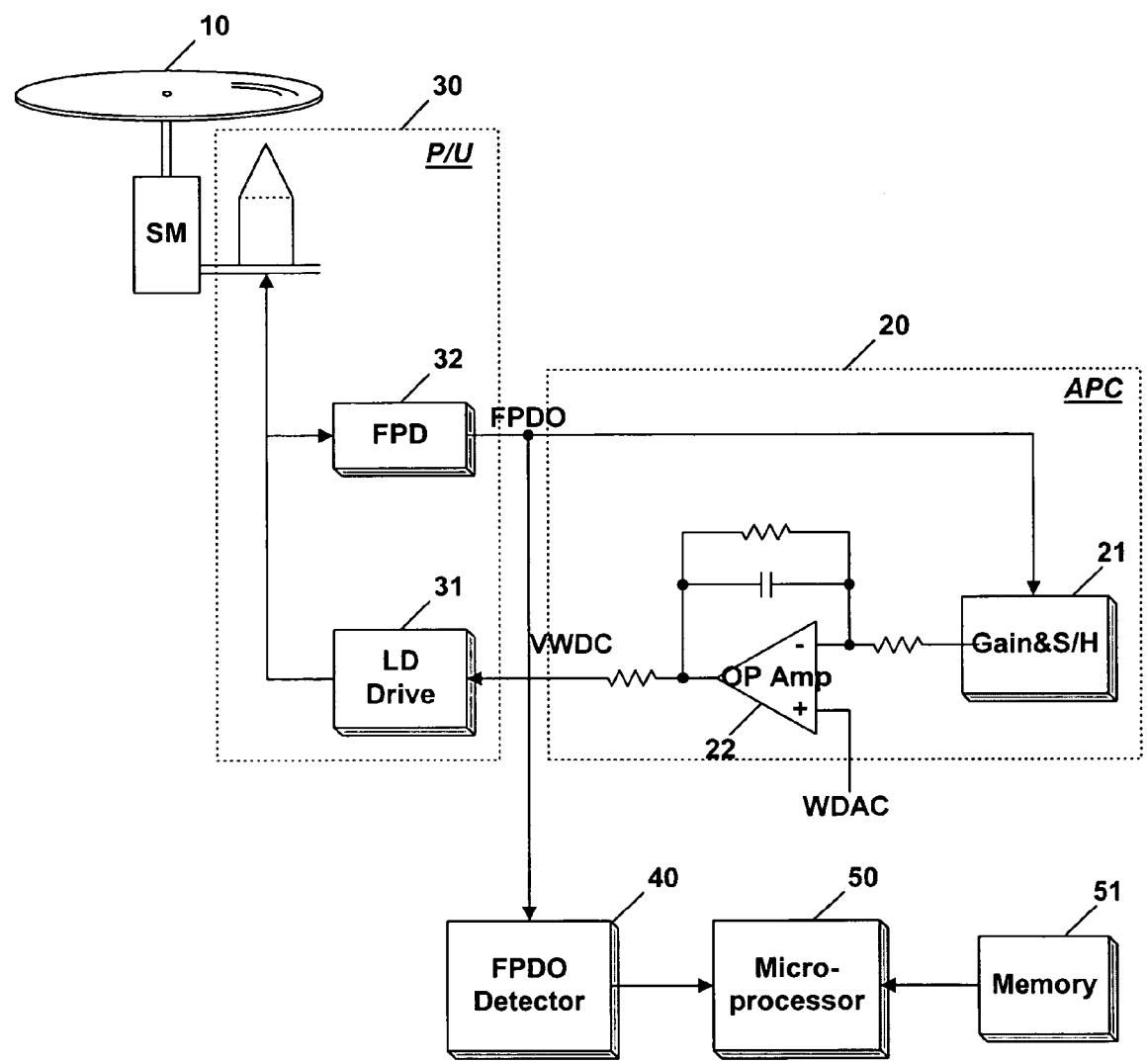
FIG. 2 is a block diagram of an optical disc drive in which a laser power setup method in accordance with an embodiment of the invention may be implemented.

FIG. 2 is a block diagram of an optical disc drive (ODD) in which a laser power setup method in accordance with an embodiment of the invention may be implemented. The ODD may include an automatic power control (APC) circuit 20 having a gain & S/H (Sample/Hold) unit 21 and an operational amplifier (OP-AMP) 22; an optical pickup unit 30 including a Laser Diode (LD) drive 31 and a Front Photo Detector (FPD) 32; a Front Photo Detector Out (FPDO) detector 40 for detecting a level of a signal output by the FPD 32; a memory 51 such as, for example, a flash ROM; and a microprocessor 50.

The APC circuit 20 generates a laser power voltage (VWDC) on the basis of an input FPDO signal and an input voltage (WDAC) signal. The LD drive 31 outputs an optical beam corresponding to the output laser power voltage VWDC. The FPD 32 detects the optical beam generated by the LD drive 31, and outputs an FPDO signal corresponding to the detected optical beam. The memory 51 stores power setup data detected during manufacture of the ODD, and stores sensitivity data "m" of an LD sensor (not shown) contained in an LD (not shown) of the optical pickup unit 30. The microprocessor 50 performs a power setup operation on a label surface of an optical disc 10 using the above-mentioned values stored in the memory 51, and performs a label printing operation at an output laser power determined by the above-mentioned power setup operation.

In accordance with another embodiment of the invention, power setup data units associated with a data surface and a label surface of the disc during manufacture of the ODD may be detected and stored in the memory 51. The microprocessor 50 may then determine a laser power level associated with the data surface or the label surface of the optical disc 10 based on the above-mentioned power setup data stored in the memory 51.

It is assumed that a setup laser power is substantially equal to a record power, and thus the method for setting a laser output power in accordance with embodiments of the invention may be applicable to both the record power and the reproduction power in the same manner as in the mentioned setup laser power discussed above.

The APC 20 is contained in an R/F IC of the ODD, and requires a laser power of predetermined magnitude to cause the ODD to perform a data recording operation on the disc 10. The laser power is determined by the input voltage (WDAC) of the APC 20, and is generally maintained at a constant level by the APC 20.

The FPDO signal corresponds to the output power of the laser beam generated from the LD drive 31, and is fed back by the FPD 32. The input voltage (WDAC) corresponds to the setup laser power. The APC 20 generates the FPDO signal fed back from the FPD 32 and a laser power voltage signal (VWDC) corresponding to the input voltage (WDAC) received via an external Digital-to-Analog Converter (DAC) (not shown), such that it can constantly maintain a predetermined laser power.

Figure 3:
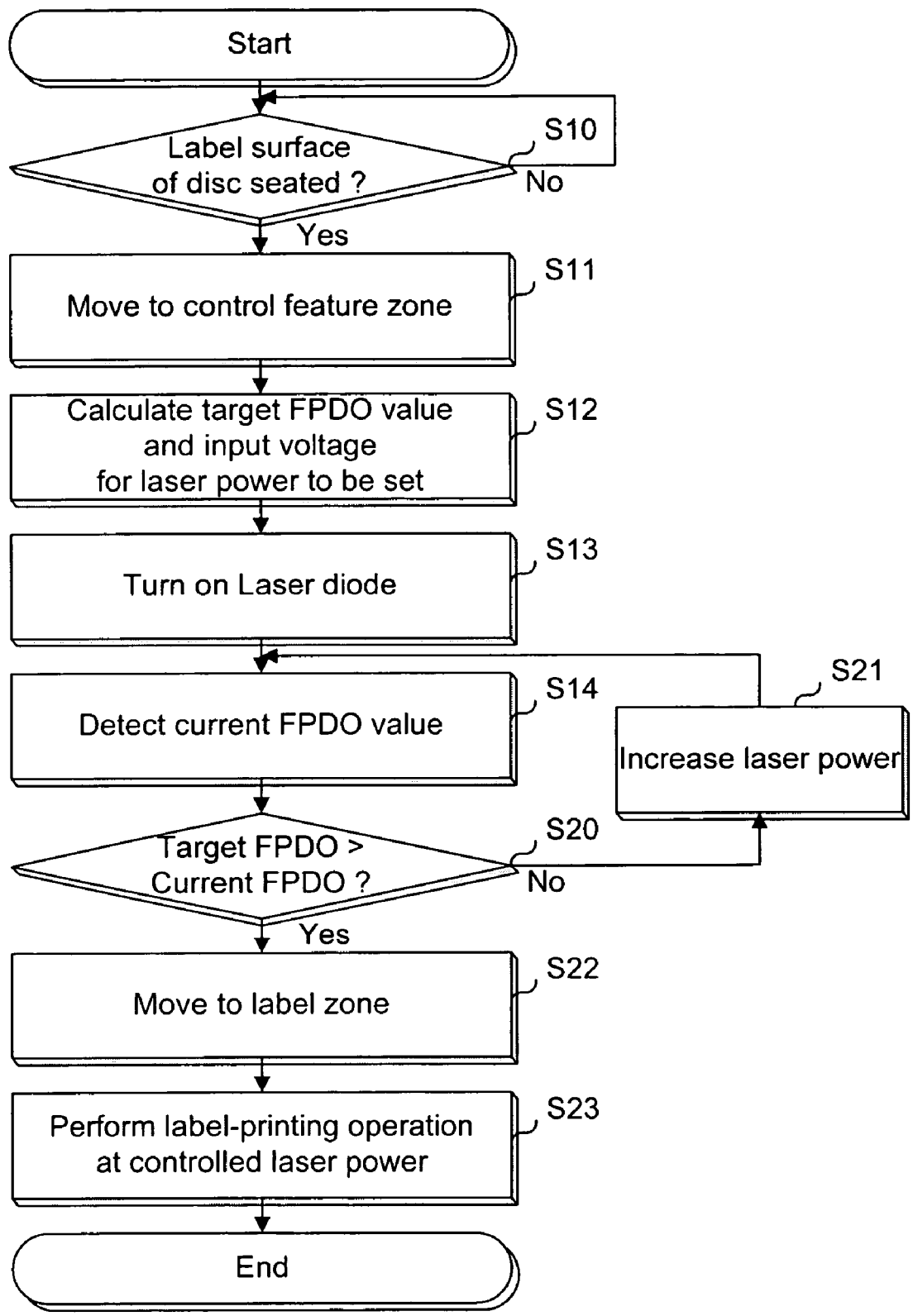
FIG. 3 is a flow chart of a method for setting a laser power of an optical disc drive in accordance with an embodiment of the invention.

FIG. 3 is a flow chart of a method for setting a laser power of an optical disc drive in accordance with an embodiment of the invention.

A linear equation relating the input voltage WDAC applied to the R/F IC to the laser power generated by the optical pickup unit 30 is established during manufacture of the ODD. If the optical pickup unit 30 generates a laser power (P1) based on a predetermined input voltage (WDAC1) applied to the R/F IC, the microprocessor 50 measures the laser power (P1), and at the same time calculates a sensitivity m associated with the optical pickup unit 30 based on the FPDO value (F1) detected by the FPDO detector 40 after being generated by the FPD 32.

The microprocessor 50 may use an appropriate measuring device, such as, for example, a laser power meter, to measure the laser power (P1), and may use information associated with various components of the optical pickup unit 30, such as, for example, an LD sensor, to determine the sensitivity m. The microprocessor 50 may calculate the sensitivity m using a predetermined equation denoted below as Eqn. 1.

$$m=(2.5-F1)/P1 \qquad \text{(Eqn. 1)}$$

The power setup data detected during manufacture of the ODD, including a linear equation relating an input voltage to a laser power and the sensitivity m of the LD sensor, may be stored in the memory 51.

A method for setting a laser power of an optical disc drive in accordance with an embodiment of the invention will now be described with reference to FIG. 3.

Figure 4:
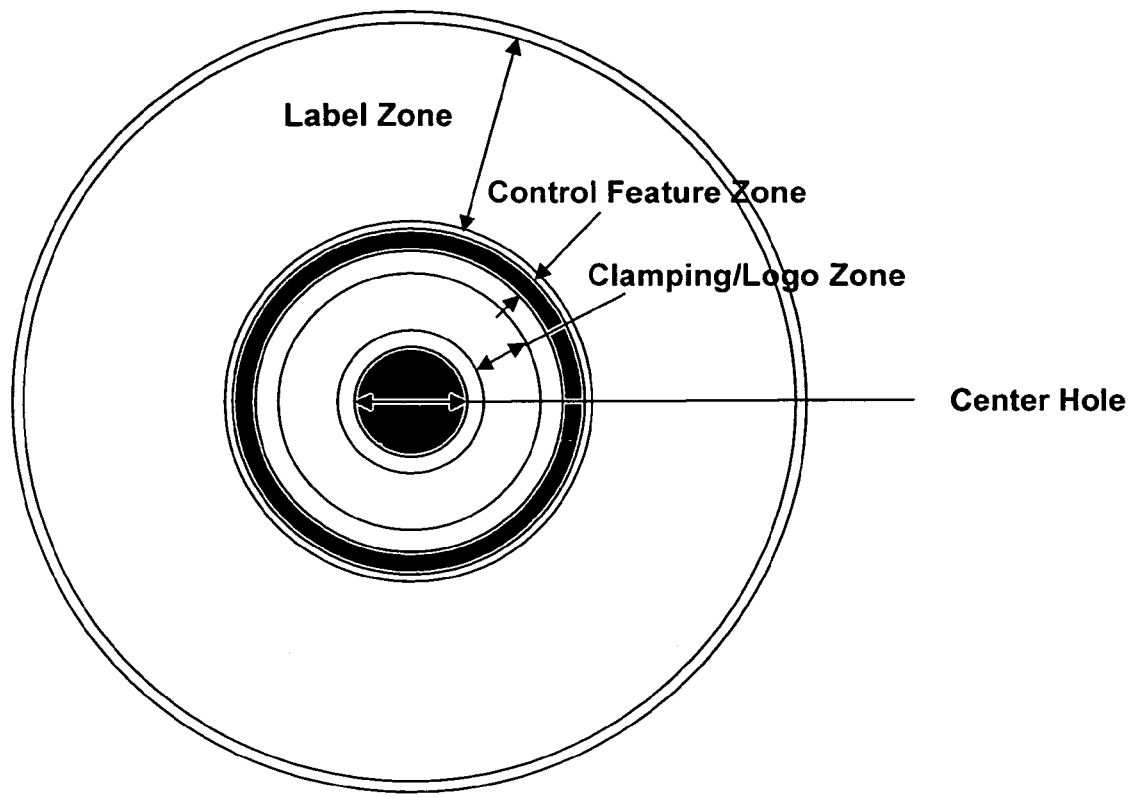
FIG. 4 illustrates a layout of a label surface of an exemplary optical disc.

If an optical disc 10 which includes a label surface, such as, for example, the LightScribe disc discussed above, is seated in the ODD, the microprocessor 50 determines whether a seated surface of the optical disc 10 is a label surface at step S10. The label surface of the disc 10 includes a control feature zone in which speed control information and media information are recorded, and a label zone in which a label-printing operation is performed, as shown in FIG. 4. If the label surface is seated at step S10, the microprocessor 50 shifts the optical pickup unit 30 to the control feature zone of the optical disc 10 at step S11, and performs a power setup operation in accordance with an embodiment of the invention, which will hereinafter be described.

The microprocessor 50 sets an output laser power required to perform a label-printing operation on the label surface of the disc 10, and calculates a target FPDO value corresponding to the set output laser power at step S12. In one embodiment of the invention, this output laser power may be 60 mW. However, other values may also be appropriate. The target FPDO may be calculated by a predetermined equation denoted below as Eqn. 2.

$$f(X)=-m*X+2.5 \qquad \text{(Eqn. 2)}$$

Figure 5:
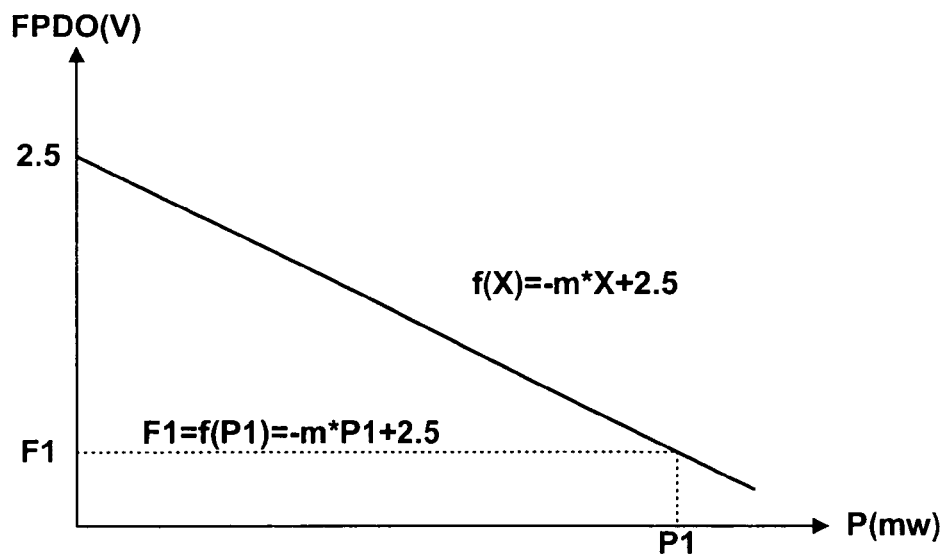
FIG. 5 is a graph of the relationship between a laser power (P) and an FPDO voltage.

In Eqn. 2, X=output laser power, m=LD sensor sensitivity, and f(X)=FPDO value corresponding to the output laser power X. The values of X and m may be stored in the memory 51. The relationship between the output laser power and the FPDO value is shown in FIG. 5.

The microprocessor 50 calculates an input voltage (WDAC) corresponding to the output laser power using the power setup data stored in the memory 51 at step S12. In this case, the power setup data corresponds to a linear equation relating the input voltage to the laser power established during manufacture of the ODD.

The microprocessor 50 transmits the calculated input voltage (WDAC) to the OP Amp 22 of the APC 20. The APC 20 generates a laser power voltage (VWDC) corresponding to the input voltage. The LD drive 31 generates a light-emitting beam corresponding to the output laser power voltage (VWDC) at step S13.

The FPD 32 detects a light-emitting beam generated from the LD drive 31, and outputs a corresponding FPDO signal. The FPDO detector 40 detects a value of the output FPDO signal, and transmits the detected FPDO value, referred to as a current FPDO for ease of discussion, to the microprocessor 50 at step S14.

The microprocessor 50 compares the target FPDO value with the current FPDO value at step S20. If the target FPDO value is higher than the current FPDO value, the microprocessor 50 maintains the setup output laser power without any change. However, if the target FPDO value is equal to or less than the current FPDO value, the microprocessor 50 increases the output laser power by a predetermined value based on a difference between the target FPDO value and the current FPDO value at step S21. The above-mentioned operations are repeated, such that a desired laser power can be established.

Figure 1:
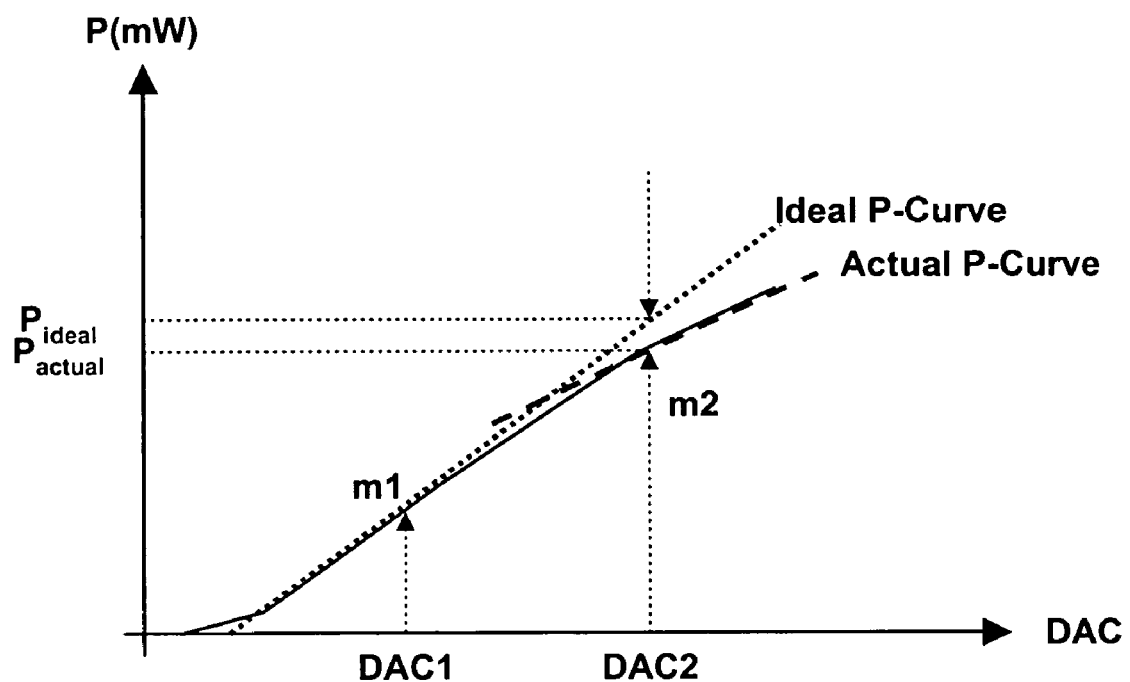
FIG. 1 is a graph of the relationship between an input voltage (DAC) and a laser power (P))

An output laser power which is higher than that of the data surface is required during a label-printing operation. Generally, if the laser output is increased above a predetermined value based on an increment of the input voltage, the linear relationship between the input signal and the output signal cannot be established, as discussed above with respect to FIG. 1, resulting in an unexpected error in a laser power setup process. Thus, although a high-output laser power for the label-printing operation may be provided, the power setup operation discussed above may be implemented to establish an optimum value for laser output power, with substantially no error.

Figure 6:
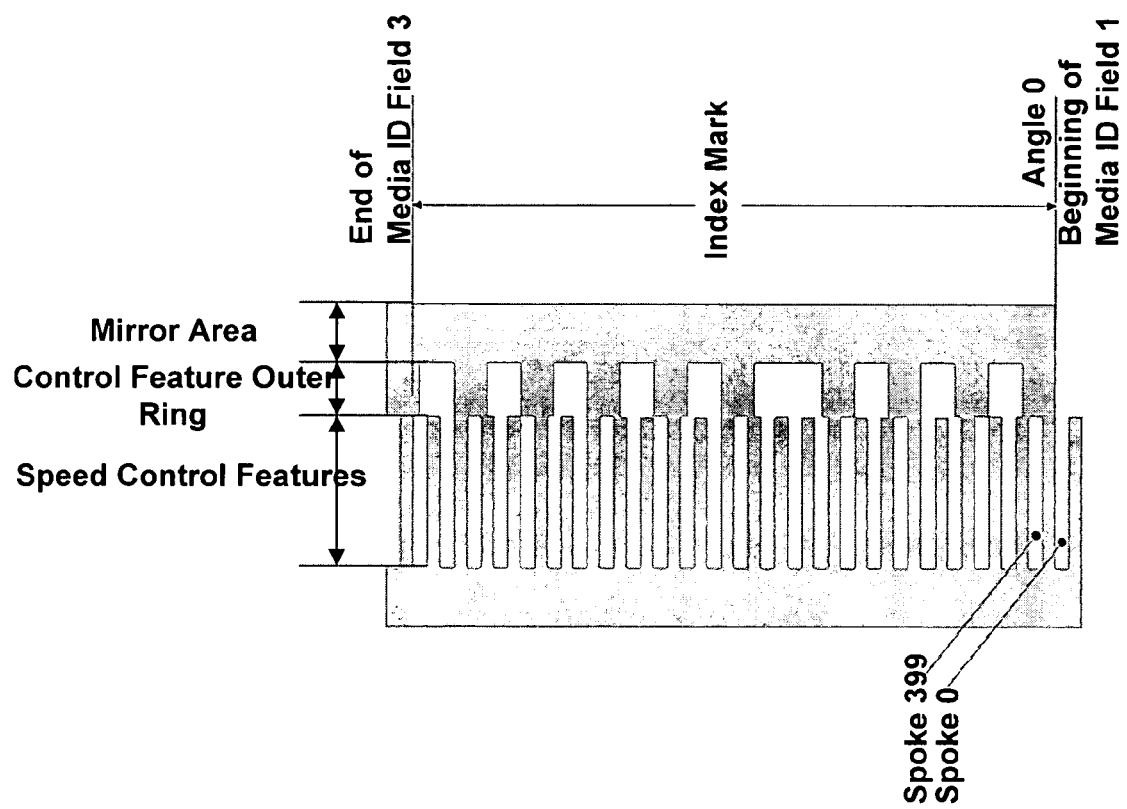
FIG. 6 illustrates a layout of a control feature zone of the exemplary optical disc shown in FIG. 4.

FIG. 6 shows a detailed configuration of a control feature zone of a label surface of an optical disc such as, for example, the LightScribe disc discussed above. The control feature zone includes a speed control feature area, a control feature outer ring area, and a mirror area.

The microprocessor 50 may move the optical pickup unit 30 to the control feature zone and perform the laser power setup operation discussed above in the control feature zone. The microprocessor 50 controls the optical pickup unit 30 to detect an index mark from an index mark pattern in the control feature outer ring area, detects a spoke with a spoke value of 0 at the beginning of the index mark pattern, and performs a synchronization operation to read media ID information from a series of media ID fields.

If an optimum output laser power is determined by the power setup operation discussed above, the microprocessor 50 moves the optical pickup unit 30 to the label zone of the optical disc 10 at step S22, and performs a label-printing operation using the output laser power adjusted by the power setup operations discussed above with respect to steps S14, S20, and S21 at step S23. The determined output laser power is maintained at a substantially constant level by the APC 20 throughout the label printing operation.

Since unexpected traces or marks may be generated on the label surface even when the power setup operation, the optical pickup unit 30 moves to the control feature zone of the label surface to perform the power setup operation. The label-printing operation can only be conducted on a label surface onto which a dye that is responsive to the laser output has first been deposited. The dye is only deposited on the label zone portion of the label surface of the disc, and not on the control feature zone.

In accordance with another embodiment of the invention, first power setup data required to record data on the data surface of the disc, and second power setup data required to print a label on the label surface of the disc may be detected and stored during manufacture of the ODD. A corresponding laser power may be determined by the power setup data selected based on different categories of recording operations.

The magnitude of an output laser power (P) associated with an input voltage (DAC) may vary based on differences between characteristics of an optical pickup unit and the R/F IC. To address these discrepancies, a laser power setup operation for each device may be performed during manufacture of the ODD, and the relationship between an input voltage and an actual laser power corresponding to the input voltage may be detected and stored. The laser power setup operation may be performed at a first reference record power for the data surface of the optical disc, and may be also performed at a second reference record power for the label surface of the disc, such that first power setup data for the data surface recording and second power setup data for the label surface recording may be detected and stored. In one embodiment of the invention, the first reference record power may be approximately 20 mW, and the second reference record power may be approximately 40 mW. However, other values may also be appropriate.

Figure 7:
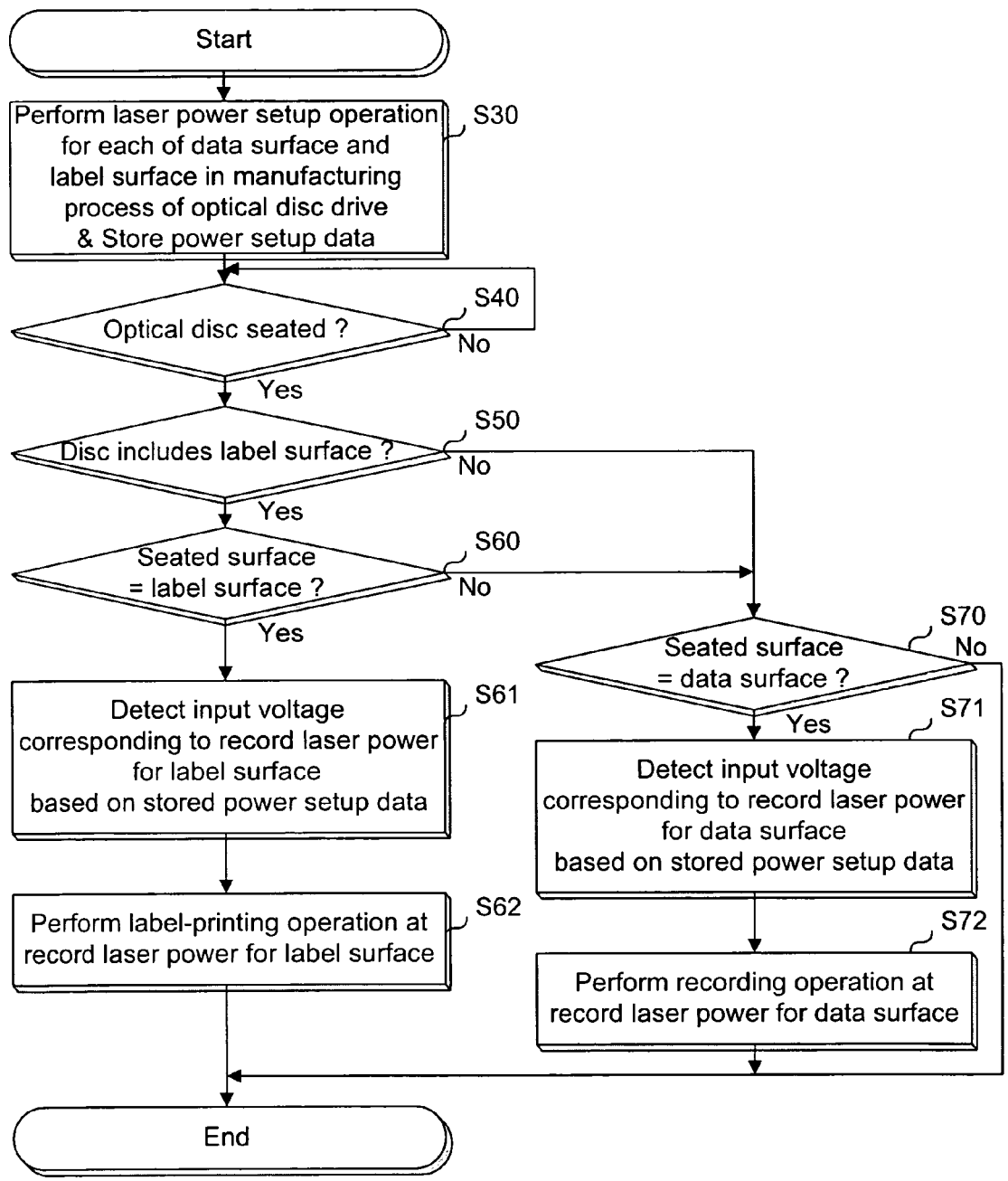
FIG. 7 is a flow chart of a method for setting a laser power of an optical disc drive in accordance with an embodiment of the invention.

FIG. 7 is a flow chart of a method for setting a laser power of an optical disc drive (ODD) in accordance with an embodiment of the invention, which will hereinafter be described with reference also to FIG. 2.

Figure 8:
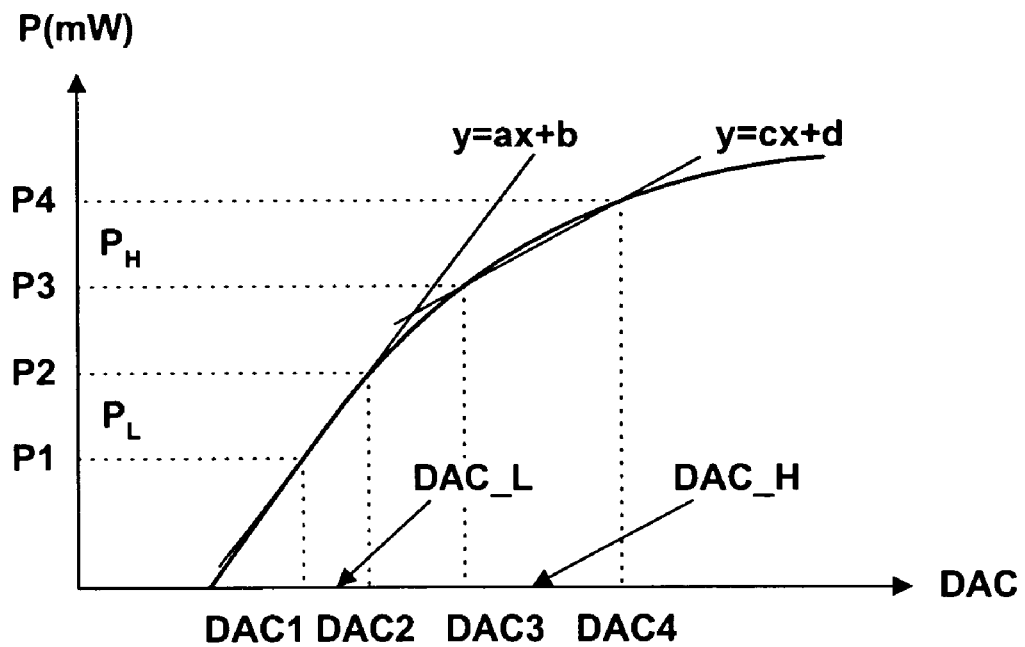
FIG. 8 is a graph of the relationship between an input voltage and a laser power used to determine a linear function at a position proximate low and high reference laser power levels, in accordance with an embodiment of the invention.

During manufacture of the ODD, a laser power setup operation is performed based on a low-output reference record power ($P_L$) for the data surface of the optical disc 10, and is also performed based on a high-output reference record power ($P_H$) for the label surface of the disc 10. As shown in FIG. 8, output laser power values P1-P4 for corresponding predetermined input voltages DAC1-DAC4 are detected based on the reference record power values $P_L$ and $P_H$. Linear functions corresponding to the detected output laser power values P1~P4 are determined to be power setup data, and are stored in the memory 51, respectively, at step S30.

More specifically, two input voltages DAC1 and DAC2 spaced apart from each other by a predetermined value DAC_L, at which it is expected that a low-output reference laser power (such as, for example, 20 mW) will be generated, are sequentially applied to the R/F IC, and actual output laser power values P1 and P2 are detected by a device such as, for example, a laser power meter. The above two input voltages DAC1 and DAC2 should be values in the vicinity of the low-output reference laser power. If, for purposes of discussion, the low-output reference laser power is, for example, 20 mW, then DAC1 and DAC2 may be, for example, 15 mW and 25 mW. Two values a and b for use in a linear equation $$y=ax+b \qquad (Eqn. 3)$$

where y=output laser power, and x=input voltage determined by two points (DAC1, P1) and (DAC2, P2) are calculated, and the calculated result is stored as power setup data for the data surface in the memory 51. An input voltage value capable of generating the low-output reference laser power of, for example, 20 mW is simply calculated based on the above-mentioned function, and the calculated input voltage value may be stored as power setup data in the memory 51.

Two input voltages DAC3 and DAC4 spaced apart from each other by a predetermined value DAC_H, at which it is expected that a high-output reference laser power (such as, for example, 40 mW) will be generated, are sequentially applied to the R/F IC, and actual output laser power values P3 and P4 are detected. The above two input voltages DAC3 and DAC4 should be values in the vicinity of the high-output reference laser power. If, for purposes of discussion, the high output reference laser power is, for example, 40 mW, then DAC 3 and DAC 4 may be, for example, 35 mW and 45 mW. Two values c and d for use in a linear equation $$y=cx+d \qquad (Eqn. 4)$$

determined by two points (DAC3, P3) and (DAC4, P4) are calculated, and the calculated result is stored as power setup data for the label surface in the memory 51. Likewise, the input voltage value capable of generating the high-output reference laser power of, for example, 40 mW is simply calculated based on the above-mentioned function, and the calculated input voltage value may be stored as power setup data in the memory 51. Although a high output reference laser power of 40 mW is referred to, simply for ease of discussion, as a reference record power for the label surface, other values which are less than a maximum output laser power of approximately 70 mW may also be appropriate as the reference record power.

Thus, an optical disc drive (ODD) which has had power setup data for the data surface and the label surface stored during the manufacturing process may set an appropriate laser output power level based on the power setup data discussed above, and may perform a record operation on the data surface and/or a label-printing operation on the label surface.

The optical disc 10 is seated in the optical disc drive at step S40 and the microprocessor 50 determines if the seated optical disc 10 includes both a data surface and a label surface, such as, for example, the LightScribe disc discussed above, at step S50. If the seated optical disc 10 includes both a data and a label surface at step S50, the microprocessor 50 determines if a surface on which the optical disc 10 is seated is a label surface at step S60. The position of a reflection surface and an amount of light reflected from a laser beam incident on the label surface are different from those in the data surface, and thus the seat surface of the optical disc 10 can be easily determined based on the different reflection surface positions and reflected light.

The microprocessor 50 then sets a laser power having a desired magnitude based on data associated with a corresponding seat surface from among a plurality of power setup data units stored in the memory 51, and performs a recording operation as appropriate. More particularly, if it is determined that the seat surface of the optical disc 10 is the label surface at step S60, the microprocessor 50 detects an input voltage (DAC) corresponding to a record laser power associated with the labelsurface from among the power setup data units stored in the memory 51 at step S61. The detected input voltage (DAC) is applied to the OP Amp 22 contained in the APC 20. The FPDO signal fed back from the FPD 32 and the laser power voltage (VWDC) corresponding to the input voltage are generated by the APC 20, such that a recording operation such as, for example, a label-printing operation is performed on the label surface of the disc 10 at step S62.

If it is determined that the seat surface of the optical disc 10 is the data surface at step S70, the microprocessor 50 detects an input voltage (DAC) corresponding to a record laser power associated with the data surface from among the plurality of power setup data units stored in the memory 50 at step S71. The detected input voltage (DAC) is applied to the OP Amp 22 of the APC 20. The laser power voltage (VWDC) corresponding to the input voltage (DAC) is generated and a recording operation is performed on the data surface at step S72.

A laser power setup operation during manufacture of the optical disc drive may be performed in different ways.

Figure 9:
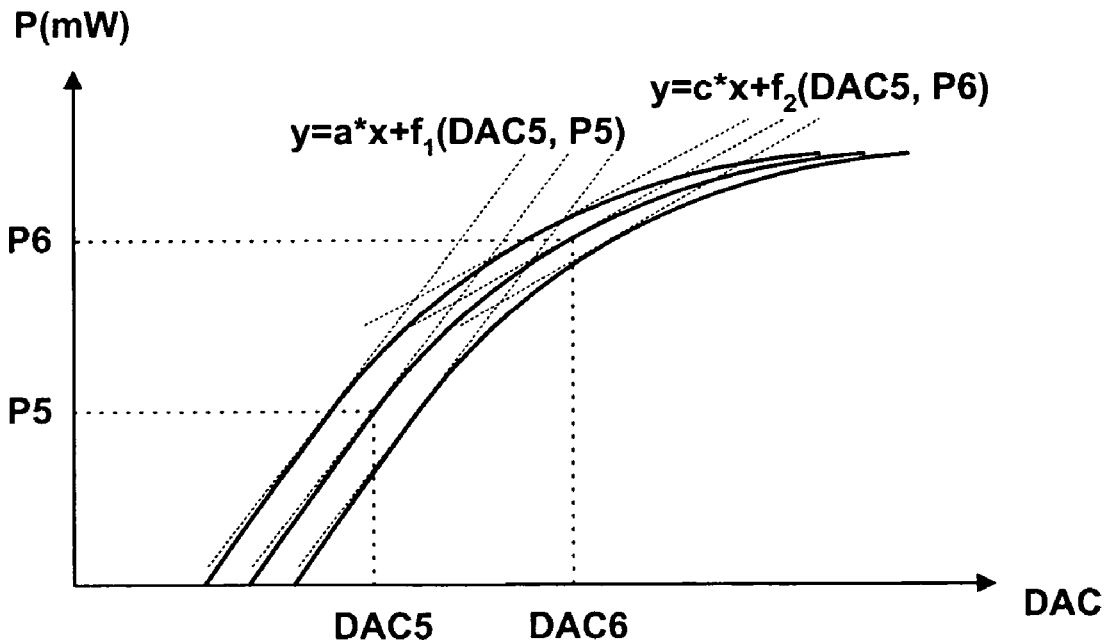
FIG. 9 is a graph of a non-linear relationship between input voltage and laser power associated with three devices, in accordance with an embodiment of the invention.

FIG. 9 is a graph of a non-linear relationship between an input voltage (DAC) and a laser power (P) for three devices, in accordance with an embodiment of the invention. The three curved lines appear somewhat similar to each other, due at least in part to characteristics associated with an optical pickup unit, and, more particularly, to characteristics of a laser diode of the optical pickup unit. Provided that a slope characteristic indicative of a linear function relating the input voltage to the output laser power is recognized, the above-mentioned linear function can be recognized on the condition that only the output laser power associated with a predetermined input voltage in each device is detected. The slope characteristic associated with each of the data surface and the label surface is pre-detected and stored based on the results of prior analysis. When performing the laser power setup operation, the output laser power for a predetermined input voltage is detected for each of the data surface and the label surface.

More specifically, during the laser power setup operation, a first input voltage (DAC5) established for the reference record power for the data surface, and a second input voltage (DAC6) established for the reference record power for the label surface are sequentially applied to the R/F IC, and corresponding actual output laser power values P5 and P6 can be detected using an appropriate device, such as, for example, a laser power meter. The linear functions discussed above for the data surface and the label surface, respectively, $$y = ax + b \quad \text{(Eqn. 3)}$$

$$y = cx + d, \quad \text{(Eqn. 4)}$$

in which x=DAC, y=laser power, a and c are indicative of the pre-stored slope characteristics, and b and d can be calculated from output laser power values P5 and P6 and the input voltages DAC5 and DAC6 can be used to calculate corresponding power setup data, which is then stored in the memory 51.

A laser power setup operation conducted during manufacture of an optical disc drive may be performed in different ways.

Figure 10:
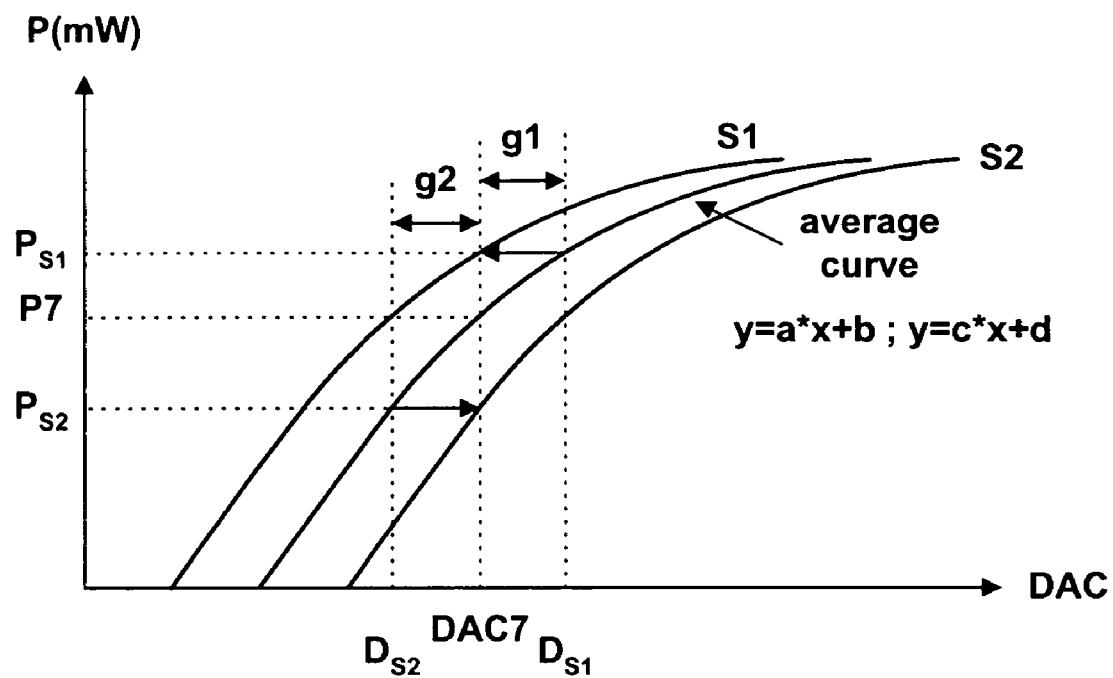
FIG. 10 is a graph of an average non-linear relationship between input voltage and output laser power compared to the same non-linear relationship taken at low and high output record reference voltages.

The three curved lines shown in FIG. 10 are indicative of individual function relationships between input voltage and laser power, and are somewhat similar to each other. That is, as a predetermined curved line moves along an input voltage axis or moves along a laser power axis, it is almost identical to the other curved lines. Therefore, if only one point is measured for a predetermined optical pickup unit where an average or mean value for several optical pickup units has pre-stored in association with the functional relationship between the input voltage and the laser power, a functional relationship between the input voltage and the laser power for the predetermined optical pickup unit can be readily calculated.

Several points contained in an average curve, or functional relationship between input voltage and laser power may be measured and stored. A first linear function such as Eqn. 3, which is capable of at least partially linearizing the curve in the vicinity of a low-output reference laser power, and a second linear function such as Eqn. 4 in the vicinity of a high-output reference laser power are calculated based on the points, and the calculated results may be stored in the memory.

When a laser power setup operation is performed for a predetermined optical disc drive, a predetermined input voltage (DAC7) is applied to the R/F IC, and actual output laser power (P7) is detected. As shown in FIG. 10, in the case of an average curve, the output laser power, generated when the predetermined input voltage (DAC7) is applied, is indicative of a predetermined number of P7. The predetermined input voltage (DAC7) may be a predetermined value between a first input voltage capable of generating a low-output reference laser power and a second input voltage capable of generating a high-output reference laser power.

Referring to the curve S1 in FIG. 10, the output laser power corresponding to the predetermined input voltage (DAC7) is denoted by a point $P_{s1}$, the point (DAC7, $P_{s1}$) is positioned above the average curve S1, and the input voltage for providing an output laser power of $P_{s1}$ on the average curve is $DAC_{s1}$. Therefore, if the average curve is shifted to the left by a distance g1 (i.e., $DAC_{s1}$-DAC7), it substantially coincides with the curve S1.

Referring to the curve S2 in FIG. 10, the output laser power corresponding to the predetermined input voltage (DAC7) is denoted by a point $P_{s2}$, the point (DAC7, $P_{s2}$) is positioned below the average curve, and the input voltage for providing an output laser power of $P_{s2}$ on the average curve is $DAC_{s2}$. Therefore, if the average curve is shifted to the right by a distance g2 (i.e., DAC7-$DAC_{s2}$), it substantially coincides with the curve of S1.

It is assumed that a first linear function in the vicinity of a low-output reference laser power associated with the average curve is denoted by y=ax+b, and that a second linear function in the vicinity of a high-output reference laser power associated with the average curve is denoted by y=cx+d.

The first and second linear function values and associated with the curve S1 may be calculated by a first equation y=a*(x+g1)+b and a second equation y=c*(x+g1)+d, respectively. As a result, the value of the first linear function may be denoted by y=a*x+b+a*g1, and the value of the second linear denoted by y=c*x+d+c*g1.

The values of the first and second linear functions associated with the curve S2 may be calculated by the equation y=a*(x−g2)+b and y=c*(x−g2)+d, respectively. As a result, the value of the first linear function may be denoted by y=a*x+b−a*g2, and the value of the second linear function may be denoted by y=c*x+d−c*g2. Therefore, no change occurs in the slopes a and c, and only the y-intercept values b and d are changed. In the case of the curve S1, the y-intercept value is denoted by b'=b+a*g1 and d'=d+c*g1. In the case of the curve S2, the y-intercept value is denoted by b"=b−a*g2 and d"=d−c*g2.

Therefore, when a laser power setup operation is performed during manufacture of the optical disc drive, the output laser power associated with only one input voltage may be simply measured, and a linear function in the vicinity of each of a low-output reference laser power and a high-output reference laser power may be simply calculated.

Figures 11, 12:
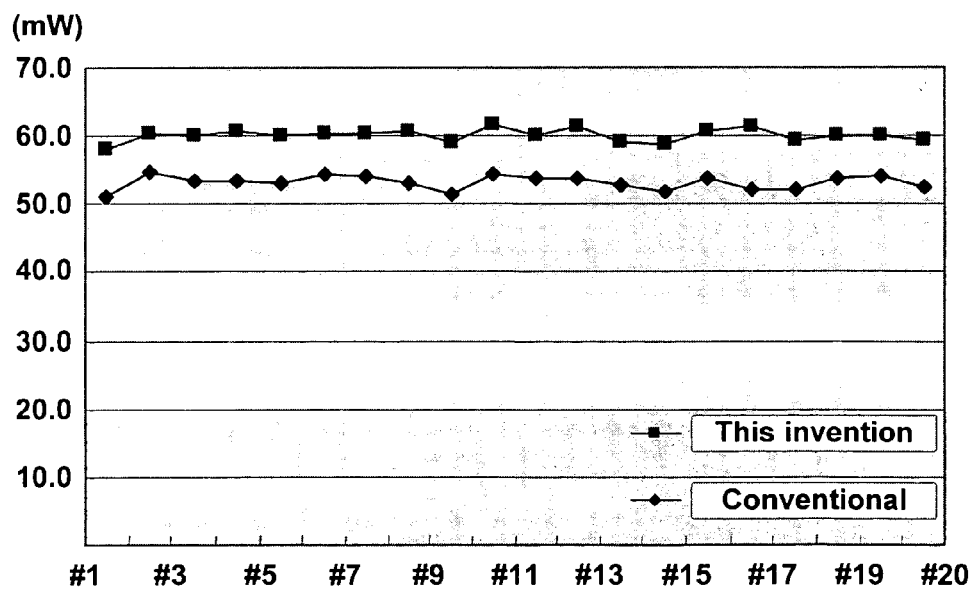
FIG. 11 is a tabulation of actual laser power output when implementing a method in accordance with an embodiment of the invention compared to laser power output using conventional methods.
FIG. 12 is a graphical representation of the tabulated data presented in FIG. 11.

FIG. 12 is a graphical representation of actual laser power output when implementing a method in accordance with embodiments of the invention compared to laser power output using conventional methods, as tabulated in FIG. 11. As can be seen from FIGS. 11-12, the methods in accordance with embodiments of the invention are superior to the conventional art where an error and deviation between the target power and the output power are concerned, in that the invention yields a laser power error less than that of the conventional art. When data is recorded on the label surface at a high-output laser power of, for example, 60 mW, an actual output laser power of in accordance with embodiments of the invention is closer to the laser power of 60 mW than in the conventional art. Furthermore, the invention exhibits reduced deviation in the output laser power as compared with the conventional art.

As apparent from the above description, a method for setting a laser power of an optical disc drive according to the present invention can determine an optimum laser power for a label surface without forming an image on the label surface, and can minimize an error of the output laser power, resulting in improvement of a label-printing operation and label quality.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for setting a laser power level in an optical disc drive, comprising:
    setting a required output laser power and calculating a corresponding target laser diode output value based on previously stored sensitivity data associated with a laser diode of the optical disc drive, and calculating an input voltage corresponding to the required output laser power based on previously stored power setup data;
    detecting an actual laser diode output value;
    comparing the actual laser diode output value to the target laser diode output value; and
    adjusting a setup output laser power based on a result of the comparison, comprising maintaining the setup output laser power at its current level if the target laser diode output value is greater than the actual laser diode output value.

2. The method of claim 1, wherein adjusting a setup output laser power based on a result of the comparison further comprises increasing the setup output laser power by a predetermined value if the target laser diode output value is less than the actual laser diode output value.

3. The method of claim 1, wherein the previously stored power setup data represents a substantially linear relationship between input voltage and corresponding output laser power.

4. The method of claim 1, wherein the previously stored sensitivity data associated with a laser diode of the optical disc drive and the previously stored power setup data comprises previously stored sensitivity data and power setup data related to a label surface of an optical disc.

5. The method of claim 1, wherein the previously stored sensitivity data associated with a laser diode of the optical disc drive and the previously stored power setup data comprises previously stored sensitivity data and power setup data related to a data surface of an optical disc.

6. The method of claim 1, wherein the previously stored sensitivity data associated with a laser diode of the optical disc drive and the previously stored power setup data are collected and stored during manufacture of the optical disc drive.

* * * * *